Dec. 28, 1954    R. L. FINCH    2,698,189
ANTIJACKKNIFING MEANS FOR TRAILERS AND PRIME MOVERS
Filed Aug. 3, 1953
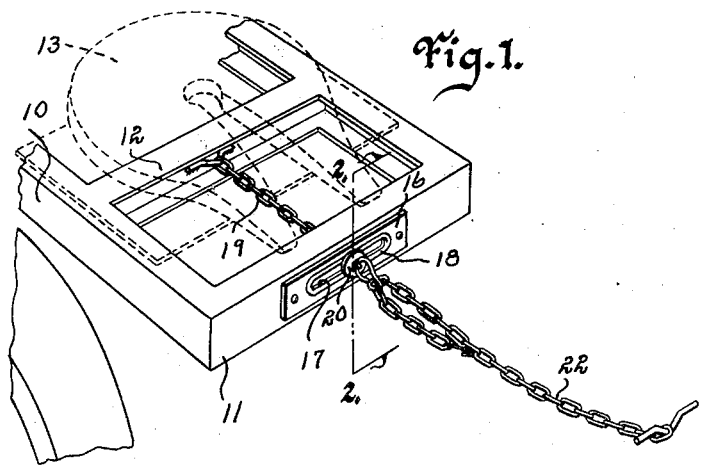
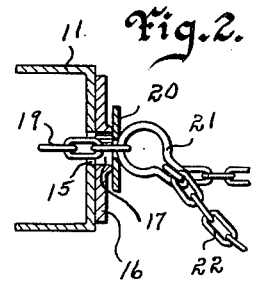
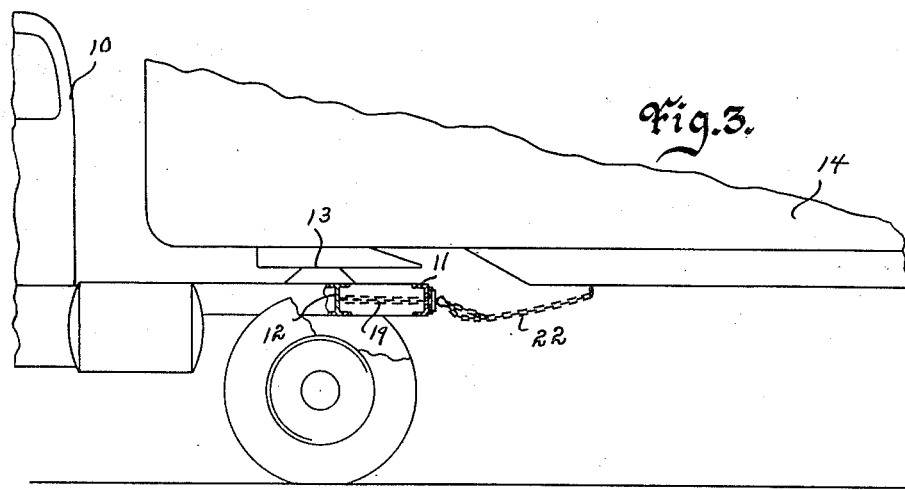
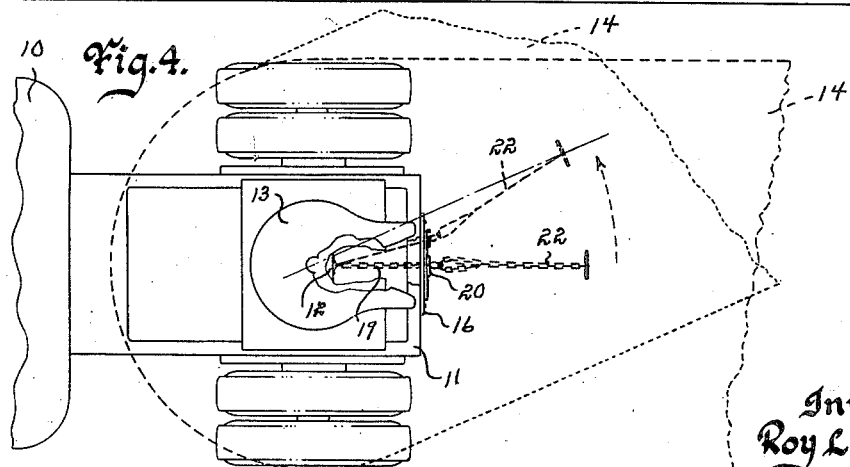
Inventor
Roy L. Finch
by Talbert Dick Adler
Attorneys
Witness
Edward P. Seeley United States Patent Office 2,698,189
Patented Dec. 28, 1954

2,698,189
ANTIJACKKNIFING MEANS FOR TRAILERS AND PRIME MOVERS

Roy L. Finch, Melcher, Iowa

Application August 3, 1953, Serial No. 372,081

9 Claims. (Cl. 280—432)

This invention relates to a safety device for preventing the jack-knifing of prime movers relative to the trailers which they are pulling.

Today the use of large semi-trailers pulled by self-propelled vehicles, generally called tractors, is becoming increasingly more in number for the transportation of freight. These trailers are usually large and capable of carrying great loads of merchandise. As is well known, they are horizontally pivoted to the rear portion of the tractor by use of means usually referred to as a "fifth wheel." Because of the comparative ease with which the front end of the trailer will pivot on the tractor, an ever present danger exists that the tractor and trailer will jack-knife relative to each other when on wet or slippery surfaces and on certain inclines. What usually happens in such accidents is that the tractor will start to skid and due to the weight of the trailer, the skidding moment will be intensified and accelerated. With the vehicle thus out of control, the entire unit will frequently leave the road and turn over in a ditch or else swing into the path of other vehicles.

Many devices have been provided and installed to reduce such hazards. Most of these devices are extremely complicated, heavy and costly, and some are activated manually by the vehicle driver. However, once such a skid has started, the operator of the vehicle is too busy and time is too short for him to manually activate the device once such a doubling up of the trailer and tractor is underway. Additional methods have employed chain means. While such chain means are much less expensive, they must be relatively tight to effectively stop the jack-knifing action before it gets underway. However, by so using the chains in tightened condition, the turning movement of the unit is greatly restricted, often necessitating the vehicle operator to detach the chains prior to making a turn.

Therefore, the principal object of my invention is to provide a sinple anti-jack-knifing means that will effectively prevent such catastrophies without limiting the normal turning of the tractor and trailer around right angle corners.

A further object of this invention is to provide a safety device of the above type that is economical in manufacture and installation between the tractor and trailer.

A still further object of this invention is to provide an anti-jack-knifing device between prime movers and trailers that is durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my device installed on the back end frame portion of a tractor Fig. 2 is an enlarged cross sectional view of a portion of the device taken on line 2—2 of Fig. 1 and more fully illustrates its construction, Fig. 3 is a side view of a tractor and trailer with my device installed and with sections cut away to illustrate the same, and Fig. 4 is a top plan view of my device installed on a tractor and trailer and illustrates its operation.

In these drawings I have used the numeral 10 to generally designate a tractor having the usual rear rectangular frame portion 11. This portion 11 extends rearwardly and horizontally and near its extreme end has the cross beam portion 12 for strengthening the same and supporting the usual lower fifth wheel portion 13 as shown in Fig. 1.

The numeral 14 generally designates the trailer with its front end portion horizontally pivoted to and supported by the fifth wheel 13 as shown in Fig. 3. It is to such equipment that I install my anti jack-knifing means and which I will now describe in detail.

I first form a horizontal slot 15 in the center of the extreme rear end of the frame portion 11 as shown in Fig. 2. On the rear of the frame 11 I mount a strengthening plate 16 having a horizontal slot 17 communicating and registering with the slot 15. On the outer side of the plate 16 and at the periphery of the slot 17, I form a continuous bead or ridge 18.

The numeral 19 designates a chain length having one end secured by any suitable means to the center rear side of the cross beam 12 and its other end extending through the slots 15 and 17. The numeral 20 designates a bearing washer threaded onto the outer end portion of the chain length 19 after the same has passed through the slots 15 and 17. The numeral 21 designates a ring extending through the rear length of the chain 19 and to the rear of the bearing washer 20 as shown in Fig. 2.

By this arrangement, the chain length 19 will be secured at both ends, will be relatively taut, but at its rear end will be capable of horizontal sliding movement due to the presence of the slot openings 15 and 17, and the ability of the bearing washer 20 to slide to the left or right on the rear frame portion of the prime mover. The bead 18 is the only frictional contact with the member 20 and therefore the friction of the sliding of the rear end portion of the chain 19 from left to right will be reduced to a minimum. The numeral 22 designates a chain length secured at one end by any suitable means to the underside center of the trailer 14 and at a point back of the rear end of the frame 11 as shown in Fig. 3. The forward end portion of the chain 22 is detachably adjustably secured to the ring link 21 as shown in Fig. 1. This chain length 22 should have some slack as shown in Fig. 3.

By this construction and arrangement of parts, the forward end of the chain 19 will be substantially within the vertical plane of the horizontal pivot means between the prime mover and trailer. In the drawings, I show this just to the rear of center of the vertical axis of the fifth wheel.

The practical operation of the device is as follows. With the same installed as shown in the drawings, when the prime mover and trailer are proceeding in a straight line, the chain lengths 19 and 22 will be in line with each other as shown in Fig. 46. However, if the prime mover is turned to left or right for guiding purposes, the rear end of the chain length 22 will accordingly move to the left or right relative to the longitudinal axis of the tractor as shown by broken lines in Fig. 4. This action, of course, will angle the chain length 22 and the unit will slide to the left or right in the horizontal slots 15 and 17. The relative length of each of these slots 15 and 17 is such that normal turns may be accomplished without my safety device becoming effective. However, if the angle of the tractor relative to the trailer becomes any greater, the chain lengths will prevent any greater angularity between the prime mover and tractor, due to the fact that the unit cannot further slide horizontally relative to the rear end of the frame of the tractor. Thus the slot openings 15 and 17 provide limiting means in both directions to the sliding moment of the two chain lengths at the rear of the tractor frame. Obviously from this turning point on the forward end of the chain length 22 will be secured against further movement relative to the tractor frame and its other end will be non-movable relative to the trailer. With this rigid linkage existing between the tractor and trailer, their angularity between each other will be immediately prevented from becoming more acute and any serious jack-knifing of the tractor and trailer will be prevented. In other words, for all intents and purposes, the chain length 19 and chain length 22 may be considered as a single chain length, with one end secured in the vicinity of the vertical axis of the fifth wheel and its other end secured to the rear at a point at the center bottom forward end portion of the trailer and with a limiting horizontal stop means at each side of such single chain means located between its two ends. Until such stop means is engaged by the chain length, the tractor may be turned freely in either direction relative to the trailer due to the arcs of the pivot points being concentric, but the moment, however, that the stop means in either direction is encountered, the forward pivot points of the chain length back of the tractor moves to a point considerably to the rear of the vertical axis and when this happens, no further relative movement between tractor and trailer can take place due to the chain length tightening between the extreme rear frame of the tractor and the trailer. Other suitable stop means may be used than that shown, but I find that the ends of the slots 15 and 17 are most effective and of simple construction.

Some changes may be made in the construction and arrangement of my anti jack-knifing means for trailers and prime movers without departing from the real spirit and purpose of my invention, and it is my intention to cover by my claims, any modified forms of structure or use of mechanical equivalents which may be reasonably included within their scope.

I claim:

1. In an anti-knifing means in combination with a tractor and trailer horizontally pivoted thereto, a flexible elongated unit having one end secured to said tractor and its other end secured to said trailer, and a stop means on said tractor and spaced apart from and at each side of said flexible elongated unit and located in the vicinity of the central portion of said flexible elongated unit.

2. In an anti jack-knifing means in combination with a tractor and trailer; said tractor having a horizontal slot in its rear central frame portion, and an elongated flexible unit having one end secured to said tractor at a point forward of said slot, its length extending through said slot, and its other end secured to said trailer at a point to the rear of said slot.

3. In an anti jack-knifing means in combination with a tractor and trailer horizontally pivoted thereto, a flexible elongated unit having one end secured to said tractor at a point at least near the vertical plane of the pivot point between tractor and trailer, and its other end secured to said trailer, and a stop means on said tractor and spaced apart from and at each side of said flexible elongated unit and located in the vicinity of the central portion of said flexible elongated unit.

4. In an anti jack-knifing means in combination with a tractor and trailer; said tractor having a horizontal slot in its rear central frame portion, an elongated flexible unit having one end secured to said tractor at a point forward of said slot, its length extending through said slot and its other end secured to said trailer at a point to the rear of said slot, and means for adjusting the length of said elongated flexible unit between said tractor and said trailer.

5. In an anti jack-knifing means in combination with a tractor and trailer; said tractor having a horizontal slot in its rear central frame portion, an elongated flexible unit having one end secured to said tractor at a point forward of said slot, its length extending through said slot and its other end secured to said trailer at a point to the rear of said slot, and a means for separating said elongated flexible unit from between said tractor and trailer.

6. In combination, a tractor, a trailer horizontally pivotally secured to said tractor, and an anti jack-knifing device, comprising, a member horizontally laterally slidable on the rear end portion of said tractor, a chain length having one end secured to said tractor in the vicinity of the pivot connection between said tractor and trailer and its other end secured to said horizontally laterally slidable member, and a second chain length having one end secured to said horizontally laterally slidable member and its other end secured to said trailer.

7. In combination, a tractor, a trailer horizontally pivotally secured to said tractor, and an anti jack-knifing device, comprising, a member horizontally laterally slidable on the rear end portion of said tractor, a means for limiting the sliding movement of said last mentioned member in two directions, a chain length having one end secured to said tractor in the vicinity of the pivot connection between said tractor and trailer and its other end secured to said horizontally laterally slidable member, and a second chain length having one end secured to said horizontally laterally slidable member and its other end secured to said trailer.

8. In combination, a tractor, a trailer horizontally pivotally secured to said tractor, and an anti jack-knifing device, comprising, a member horizontally laterally slidable on the rear end portion of said tractor, a chain length having one end secured to said tractor in the vicinity of the pivot connection between said tractor and trailer and its other end secured to said horizontally laterally slidable member, and a second chain length having one end detachably secured to said horizontally laterally slidable member and its other end secured to said trailer.

9. In combination, a tractor, a trailer horizontally pivotally secured to said tractor, and an anti jack-knifing device, comprising, a member horizontally laterally slidable on the rear end portion of said tractor, a chain length having one end secured to said tractor in the vicinity of the pivot connection between said tractor and trailer and its other end secured to said horizontally laterally slidable member, and a second chain length having one end detachably adjustably secured to said horizontally laterally slidable member and its other end secured to said trailer.

References Cited in the file of this patent

UNITED STATES PATENTS

| Number | Name | Date |
|---|---|---|
| 1,211,825 | Curl | Jan. 9, 1917 |
| 2,565,285 | Wakeman | Aug. 21, 1951 |
| 2,625,406 | Black | Jan. 13, 1953 |
| 2,668,720 | Finch | Feb. 9, 1954 |